Nov. 20, 1962   L. E. BOHL ETAL   3,065,279
RESOLUTION OF TRICHLOROETHYLENE FROM REACTION PRODUCTS
Filed Aug. 24, 1960
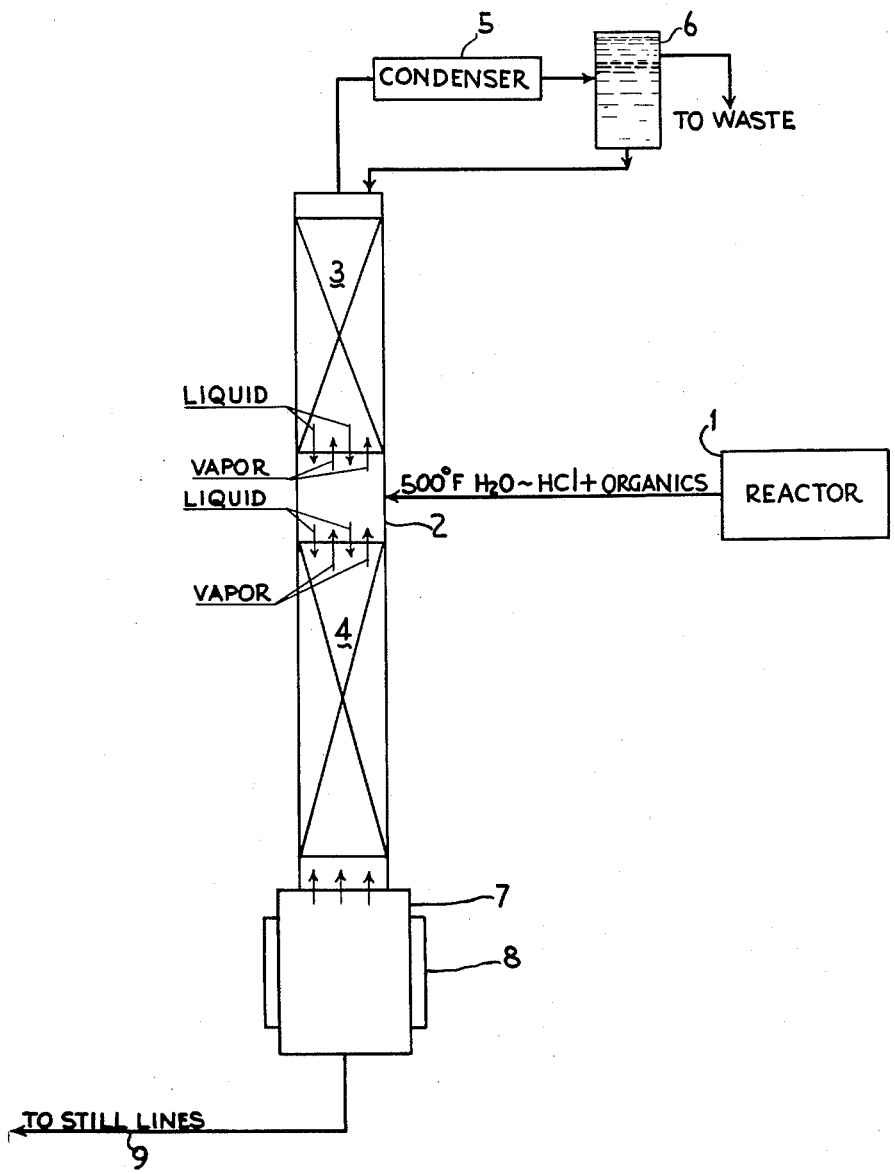
INVENTORS
LESTER E. BOHL and
RAYMOND M. VAN CAMP
BY
Oscar L. Spencer
ATTORNEY 3,065,279
RESOLUTION OF TRICHLOROETHYLENE FROM
REACTION PRODUCTS
Lester E. Bohl and Raymond M. Vancamp, New Martinsville, W. Va., assignors, by mesne assignments, to Pittsburgh Plate Glass Company
Filed Aug. 24, 1960, Ser. No. 51,676
4 Claims. (Cl. 260—654)

The present invention relates to the production of chlorinated hydrocarbons. More particularly, the present invention relates to the preparation of perchloroethylene and trichloroethylene from symmetrical tetrachloroethane.

It is known according to United States Letters Patent 2,342,100, granted February 24, 1944, to Oliver W. Cass, that trichloroethylene and perchloroethylene may be prepared by reacting symmetrical tetrachloroethane and oxygen in the vapor phase in the presence of a catalyst. The reaction involved may be conveniently illustrated by the following equation:

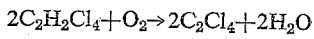

During the oxidation process, trichloroethylene is also formed. It is theorized that trichloroethylene is formed by the dehydrochlorination of the symmetrical tetrachloroethane feed. This may be represented by the following equation:

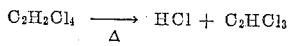

While the method described for producing perchloroethylene and trichloroethylene from symmetrical tetrachloroethane presents to the art a satisfactory process for the production of these desirable chlorinated hydrocarbon solvents, some problems are introduced by virtue of the reactions involved which detract from the overall attractiveness of the process. Inherently the process produces large quantities of water as a by-product of the basic reaction resulting in the production of perchloroethylene. In addition, quantities of hydrochloric acid are produced by the hypothesized dehydrochlorination of symmetrical tetrachloroethane and other chlorohydrocarbons produced during the oxidation of the symmetrical tetrachloroethane feed. The product streams from such reactions also contain varying quantities of desirable trichloroethylene and perchloroethylene as well as small quantities of dichloroethylenes and higher chlorinated saturated hydrocarbons.

Thus, normally product streams issuing from a reaction zone producing perchloroethylene and trichloroethylene by catalytic oxidation as described in the above referred to United States patent contain large quantities of water, quantities of HCl and chlorinated hydrocarbons both saturated and unsaturated. Normally these materials are separated by fractional distillation. While fractional distillation is an effective method of separating the products formed by this reaction, the presence of large quantities of water and the HCl seriously detracts from the desirable features of the process since after condensation of the gaseous products corrosion resistant equipment usually must be employed because of the presence of HCl and water in the condensed product. In lieu of employing this equipment, drying and neutralization steps are required.

According to the present invention, reactant gases from a catalytic vapor phase oxidation of symmetrical tetrachloroethane are conveniently condensed and perchloroethylene and trichloroethylene product selectively obtained therefrom in a simple efficient manner which does not require recourse to special corrosion resistant equipment and/or drying and neutralization steps for handling the condensed liquid products. By virtue of this novel process, perchloroethylene and trichloroethylene products obtained from a catalytic vapor phase oxidation process are collected in the substantial absence of water and separation of these desirable products can be conducted in distillation equipment requiring no special materials of construction. Trichloroethylene and perchloroethylene product streams obtained by the novel collection process herein described contain substantially no water therein and are substantially free of HCl contamination.

The process of the present invention involves contacting a product stream from a catalytic vapor phase oxidation process wherein symmetrical tetrachloroethane is reacted with oxygen to produce a product stream containing perchloroethylene, trichloroethylene, hydrocarbon chlorides such as dichloroethylenes, pentachloroethane, hexachloroethane, and the like, water and HCl, with an upwardly rising vaporous mixture of trichloroethylene and perchloroethylene while continuously providing above the contact point of the vapor stream downwardly flowing liquid mixture of trichloroethylene and hydrocarbon chlorides boiling below trichloroethylene. By virtue of this vaporous contact with upwardly rising vapors of trichloroethylene and perchloroethylene and the downwardly showering stream of trichloroethylene and lower boiling chlorinated hydrocarbons, preferential separation of the trichloroethylene and perchloroethylene components of the reactant gas stream is readily accomplished while water, HCl, and materials having boiling points below the boiling point of trichloroethylene are removed from the contact zone as an upwardly rising gas stream. Trichloroethylene and perchloroethylene condensed in the contact zone are removed from the contact zone and collected. It is found in the operation of such a process that the trichloroethylene and perchloroethylene so collected contain substantially no water or HCl therein, i.e., less than thirty parts per million of either material. Perchloroethylene and trichloroethylene collected in this manner may be fed in conventional equipment such as steel lines to steel distillation columns and separated therein by recourse to conventional fractional distillation techniques.

The reactant gas streams treated in accordance with the teachings of this invention may be provided by reacting symmetrical tetrachloroethane and oxygen in the presence of a suitable catalyst at elevated temperatures. An oxidation catalyst is normally employed to promote the reaction between the oxygen and the symmetrical tetrachloroethane feed material. A great variety of materials are suitable as catalysts for these reactions and generally catalysts which may be used are heavy metals or light metals, oxides and salts of such metals. Oxides and compounds of iron and bismuth are effective catalysts for these reactions and copper oxides and chlorides have been found extremely effective. A particularly effective catalyst for conducting this reaction is a cupric chloride-zinc chloride-calcium chloride mixture impregnated on a carrier, the carrier being in the form of finely-divided solid particles.

The catalyst is conveniently impregnated on a supporting material such as alumina, alumina gels, silica, silica gels, calcium silicate, diatomaceous earth, infusorial earth, pumice, kieselguhr, and other like materials which are in the form of finely-divided solid particles.

Typically in the performance of the catalytic vapor phase oxidation of symmetrical tetrachloroethane, the tetrachloroethane and oxygen are passed through a reactor which is filled with a mixed cupric chloride-zinc chloride-calcium chloride composition impregnated on a suitable support or carrier. The gases are fed at a rate such that contact time of the gases within the reaction zone is maintained usually between 3 and 20 seconds. The temperature of the reaction zone is maintained usually between 570° F. to 930° F. and preferably between 680° F. to 800° F.

Generally, symmetrical tetrachloroethane and oxygen are fed in stoichiometric mole ratio required for the conversion of symmetrical tetrachloroethane to perchloroethylene. Thus, 0.5 mole of oxygen per mole of symmetrical tetrachloroethane is normally employed. The mole ratio of the feed materials however is subject to some variation and anywhere between one-tenth and eight-tenths of a mole of oxygen per mole of symmetrical tetrachloroethane may be fed to the reaction zone if desired.

It has been found in conducting this reaction that oxygen in the relatively pure state is preferably employed. Diluted oxygen may be employed if desired, though somewhat lower conversions and yields have been experienced using diluted oxygen such as air. Conducting the oxidation of symmetrical tetrachloroethane in the above manner results in the production of a gaseous organic product stream issuing from the reaction zone, the composition of which is predominantly perchloroethylene and trichloroethylene. Quantities of dichloroethylenes and higher chlorinated saturated aliphatic hydrocarbons such as pentachloroethane, hexachloroethane, and the like are also found. In addition, large quantities of water and some HCl are also produced. Gases issuing from these reaction zones are at elevated temperatures usually in the range of 570° F. to 930° F. and are cooled to a temperature sufficient to condense the perchloroethylene and trichloroethylene desired product.

In accordance with the teachings herein contained, reactant gases such as produced in a reaction zone in which symmetrical tetrachloroethane and oxygen have been reacted to provide a perchloroethylene-trichloroethylene reactant gas stream containing appreciable quantities of water and some HCl is fed to a cooling zone. These gases are conveniently fed to an intermediate portion of the cooling zone and the cooling zone is provided with an upwardly rising stream of trichloroethylene and perchloroethylene vapors conveniently supplied by a boiling liquid body of hydrocarbon chlorides containing predominantly perchloroethylene and trichloroethylene, and a downwardly flowing liquid stream of trichloroethylene and chlorinated hydrocarbons boiling at a boiling point lower than that of trichloroethylene (below 189° F.). The reactant gases fed to the cooling zone are preferably introduced at a point in the zone which represents an interface between a vaporous mixture of trichloroethylene and perchloroethylene and a downwardly flowing liquid stream of trichloroethylene and lower boiling chlorinated hydrocarbons which are being vaporized in the zone. Vaporization of the lower boiling chlorinated hydrocarbons and trichloroethylene being showered down upon the reactant gases in liquid form is accomplished at the expense of the heat carried by the reactant gases being fed to the cooling zone. Some trichloroethylene and all of the perchloroethylene and higher boiling chlorinated hydrocarbons fed to this zone are thus cooled to a sufficient degree to result in their condensation in the uprising vaporous mixture of trichloroethylene and perchloroethylene and the condensed liquid falls to the bottom of the zone countercurrent to the upwardly rising trichloroethylene and perchloroethylene and is collected in the boiling liquid body supplying the vapors. In this manner, any water or HCl condensed during the condensation of the higher boiling chlorinated hydrocarbon materials are stripped from these materials as they descend to the bottom of the cooling zone. The trichloroethylene and perchloroethylene product condensed in the zone reaches the bottom of the zone in an essentially anhydrous condition and free of any contaminating quantities of HCl. Material collected in the bottom of the zone can be readily transported from the cooling zone to a standard fractional distillation train in conventional steel equipment and recourse to any glass or other specialized type corrosion resistant material is unnecessary. No drying or neutralization steps are required.

During the cooling of the reactant gases in the contact or cooling zone, quantities of trichloroethylene product introduced into the cooling zone are vaporized and taken off over head from the zone with the water and HCl contaminants. This trichloroethylene along with any lower boiling chlorinated hydrocarbons such as cis or trans dichloroethylene and the like are fed to a condenser located in close proximity to the cooling zone and upon condensation these hydrocarbon chlorides are conveniently separated such as by phase separation from the water and HCl as muriatic acid contained therein and returned to the column as the liquid hydrocarbon chloride shower utilized to cool the reactant gases being fed into the zone.

For a more complete understanding of the instant invention, reference is made to the accompanying drawing which shows diagrammatically the operation of the process involved.

As shown in the drawing, gases issuing from reactors 1 are introduced into the column 2 at a point intermediate two packed sections 3 and 4. Gaseous products removed from the column are passed through a condenser 5 and the condensed material is phase separated in phase separator 6. The organic phase is utilized at least in part as reflux to the column in the upper section 3.

Organics, notably trichloroethylene and perchloroethylene, are also condensed in the column and are collected in the still bottom or pot 7. The strip heaters 8 supply heat to the still pot 7 in quantities sufficient to provide in secion 4 of the column an upwardly rising vapor mixture of trichloroethylene and perchloroethylene. Water and HCl which condenses during the condensation of the product perchloroethylene and trichloroethylene of the reactor feed stream is vaporized by the upwardly rising perchloroethylene trichloroethylene vapors and leaves the column at the upper end. Removal of the undesirable water and HCl takes place in the phase separator 6. Periodically or continuously, if desired, dry and substantially acid free product is removed from the pot and introduced through a line 9 to the distillation purification and recovery system.

By virtue of this cooling and stripping operation, a very efficient, economical and easily operated process is provided for collecting perchloroethylene and trichloroethylene from a gas stream containing large contaminating quantities of HCl and water. In addition to providing ready separation of the desired hydrocarbon chloride solvent materials, the process provides a liquid hydrocarbon chloride product which may be readily distilled in conventional fractional distillation equipment, thus eliminating the use of expensive corrosion resistant equipment and/or drying or neutralization steps.

For an even more complete understanding of the present invention, reference is made to the following examples which typify methods which may be employed in accordance with this invention.

EXAMPLE I

A cupric chloride-zinc chloride catalyst solution was prepared by dissolving 444 grams (2.6 moles) of $$CuCl_2 \cdot 2H_2O$$

and 140 grams (1.03 moles) of $ZnCl_2$ in 350 milliliters of water. A liter of Celite pellets (a Lompoc, California diatomaceous earth sold by Johns Manville Corporation) was then added to the solution. The pellets were 3/16 (three-sixteenths) inch in diameter by ¼ (one-fourth) inch long. Drying of the catalyst was achieved by evaporating most of the water from the mixture while mixing and then heating the catalyst in thin layers on trays to remove the remaining water.

EXAMPLE II

A jacketed reactor comprised of three (3) vertical one and one-half (1½) inch internal diameter nickel tubes nine (9) feet long was filled with 13.5 pounds of catalyst prepared as described in Example I. This catalyst charge provided a catalyst bed eight (8) feet long in each of the tubes. Dowtherm (a eutectic mixture of diphenyl and diphenyl oxide manufactured by the Dow Chemical Company) was circulated in the reactor jacket during operation to maintain temperature control.

Liquid symmetrical tetrachloroethane was fed at a rate of 11.2 pounds per hour through a vaporizer, mixed with substantially pure oxygen and the resulting gaseous mixture was introduced into the reactor. The oxygen feed was adjusted to provide 0.5 mole of oxygen per mole of tetrachloroethane fed. The reactor jacket temperature was maintained at 720° F. during the reaction. Exit gases from the reactor were passed into a glass column twenty (20) feet high and having an internal diameter of four (4) inches. A glass reboiler having a total volume of two (2) gallons was attached to the bottom of the column. Exit gases from the top of the reactor were passed into the glass column at the mid point. Arranged around the reboiler were electrical strip heaters which were electrically operated to provide a temperature in the reboiler of 230° F. to 240° F. The top of the column was operated at a temperature of 160° F. to 175° F. Liquid hydrocarbon chlorides predominantly trichloroethylene were introduced into the top of the column at a temperature of 100° F. The gases emerging from the reactor were fed to the column at a rate of 11.95 pounds per hour and at a temperature of 500° F. Feed of the liquid mixture of hydrocarbon chlorides to the top of the column was maintained at the rate of 0.282 pound per hour. Liquid product containing perchloroethylene and trichloroethylene was removed as bottoms from the reboiler at the rate of 10.2 pounds per hour. An analysis of feed to the column and the compositions of the overhead and bottoms obtained is shown in Table I.

Table I

[Compositions (weight percent)]

| | Feed | Bottoms | Overhead |
|---|---|---|---|
| 1,1,2,2 $C_2H_2Cl_4$ | 14.28 | 16.74 | |
| $C_2HCl_3$ | 17.01 | 18.15 | 10.27 |
| $C_2HCl_5$ | 4.97 | 5.82 | |
| $C_2Cl_4$ | 50.33 | 59.0 | |
| $C_2Cl_6$ | 0.25 | 0.29 | |
| 1,2 $C_2H_2Cl_2$ | 0.63 | | 4.28 |
| $CHCl_3$ | 0.13 | | 0.91 |
| $CCl_4$ | 0.15 | | 1.03 |
| HCl | 6.57 | | 44.1 |
| $H_2O$ | 4.54 | | 31.80 |
| $CO_2$ | 0.36 | | 2.45 |
| $O_2$ | 0.02 | | 0.11 |
| CO | 0.18 | | 1.20 |
| $N_2$ | 0.09 | | 0.63 |

As can be readily seen from the above example by virtue of the instant process, perchloroethylene and trichloroethylene products are readily obtained from reactant gases issuing from a catalytic vapor phase oxidation reaction involving tetrachloroethane and containing substantially no water or HCl.

While the invention has been described with specific reference to reactant gases formed during the catalytic vapor phase oxidation of symmetrical tetrachloroethane, it is of course not intended to be so limited. Any perchloroethylene-trichloroethylene gas stream containing water and HCl may be treated in accordance with the teachings herein contained without departing from the spirit of the invention. Thus, while the invention has been described with reference to certain specific examples, it is to be understood that the invention is not to be limited thereby except insofar as appears in the accompanying claims.

We claim:

1. In a process for the production of perchloroethylene and trichloroethylene by the catalytic vapor phase oxidation of symmetrical tetrachloroethane to thereby produce a product stream containing perchloroethylene, trichloroethylene, hydrocarbon chlorides, water and HCl, the improvement which comprises contacting said product stream with an upwardly rising vaporous mixture of trichloroethylene and perchloroethylene while continuously providing above the contact point of the upwardly rising vapors and said stream a downwardly flowing liquid mixture of trichloroethylene and hydrocarbon chlorides boiling below trichloroethylene to thereby effect a condensation of trichloroethylene and perchloroethylene components of said stream while separating the water and HCl components of said stream from the condensed trichloroethylene and perchloroethylene product, and collecting the condensed trichloroethylene and perchloroethylene product in the substantial absence of water.

2. A process for recovering trichloroethylene and perchloroethylene from a gas stream containing trichloroethylene, perchloroethylene and water comprising introducing said stream into a zone of upwardly rising vapors of trichloroethylene and perchloroethylene supplied by a boiling liquid body of trichloroethylene and perchloroethylene, contacting said stream and said vapors while continuously feeding to the zone of contact a downwardly flowing liquid stream of hydrocarbon chlorides boiling below the boiling point of trichloroethylene, condensing perchloroethylene and trichloroethylene from said gas stream while removing the water therefrom as an upwardly rising vapor and collecting the condensed perchloroethylene and trichloroethylene in said liquid body in the substantial absence of water.

3. A process for recovering trichloroethylene and perchloroethylene from a gas stream containing trichloroethylene, perchloroethylene, water and HCl comprising introducing said stream into a zone of upwardly rising vapors of trichloroethylene and perchloroethylene supplied by a liquid body of trichloroethylene and perchloroethylene maintained at a temperature of between 230° F. and 240° F., contacting said stream with the upwardly rising vapors while continuously feeding to the zone of contact a downwardly flowing liquid stream of hydrocarbon chlorides boiling below the boiling point of trichloroethylene, condensing perchloroethylene and trichloroethylene from said stream while vaporizing said liquid stream, removing the water and HCl from said product stream as upwardly rising vapors in the vaporized hydrocarbon chlorides from said liquid stream and collecting the condensed perchloroethylene and trichloroethylene in said liquid body in the substantial absence of water.

4. A process for recovering trichloroethylene and perchloroethylene from a gas stream containing trichloroethylene, perchloroethylene, water and HCl comprising introducing said gas stream into a zone containing upwardly rising vapors of trichloroethylene and perchloroethylene from a liquid body of trichloroethylene and perchloroethylene, contacting said gas stream with the upwardly rising vapors while continuously feeding to the contact zone a downwardly flowing liquid stream of hydrocarbon chlorides boiling below the boiling point of trichloroethylene, condensing perchloroethylene and trichloroethylene from said gas stream while vaporizing said liquid stream, removing water and HCl from said gas stream as upwardly rising vapors in the vaporized hydrocarbon chlorides, condensing said vaporized hydrocarbon chlorides, water and HCl, separating the hydrocarbon chlorides from the condensed mixture and returning at least a portion of the separated hydrocarbon chlorides as said liquid stream to the contact zone and collecting the condensed perchloroethylene and trichloroethylene in said liquid body in the substantial absence of water.

References Cited in the file of this patent
UNITED STATES PATENTS

| | | |
|---|---|---|
| 2,538,723 | Fruhwinth et al. | Jan. 16, 1951 |
| 2,938,931 | Thermit | May 31, 1960 |

UNITED STATES PATENT OFFICE
CERTIFICATE OF CORRECTION

Patent No. 3,065,279 November 20, 1962

Lester E. Bohl et al.

It is hereby certified that error appears in the above numbered patent requiring correction and that the said Letters Patent should read as corrected below.

Column 5, Table I, fourth column, lines 9 and 10 thereof, for "44.1" and "31.80", respectively, read -- 44.81 -- and -- 31.0 --; respectively.

Signed and sealed this 31st day of March 1964.

(SEAL)
Attest:
ERNEST W. SWIDER

Attesting Officer

EDWARD J. BRENNER

Commissioner of Patents